F. T. SNOW & P. E. MAURER.
AUTOMOBILE CLUTCH LOCK.
APPLICATION FILED MAR. 20, 1918.

1,267,926.

Patented May 28, 1918.

WITNESSES
O. M. Vrooman
C. L. Johnson

INVENTORS.
FRANCIS T. SNOW
PETER E. MAURER
By F. C. Bates
THEIR ATTORNEY.

UNITED STATES PATENT OFFICE.

FRANCIS T. SNOW AND PETER E. MAURER, OF SAN JOSE, CALIFORNIA.

AUTOMOBILE-CLUTCH LOCK.

1,267,926.   Specification of Letters Patent.   Patented May 28, 1918.

Application filed March 20, 1918.   Serial No. 223,500.

*To all whom it may concern:*

Be it known that we, FRANCIS T. SNOW and PETER E. MAURER, citizens of the United States, and residents of San Jose, in the county of Santa Clara and State of California, have invented a certain new and useful Improvement in Automobile-Clutch Locks, of which the following is a specification.

Our invention relates to automobile clutch lock to be attached to the floor of an automobile in such a manner that the lock will engage the clutch pedal, and hold the clutch out of engagement.

It is the object of our invention to provide a simple and easily adjustable clutch lock, which can be attached to the floor of an automobile in such a manner that it may be operated by the foot and lock the clutch out of engagement, to prevent the clutch from being operated in the absence of the driver of the automobile.

A still further object of our invention is generally to improve this class of automobile clutch locks so as to increase their utility and efficiency.

Further objects and advantages will appear in the following description, it being understood that various changes in form, proportions and minor details of construction may be resorted to within the scope of the appended claims.

For a full understanding of our invention and the merits thereof, reference is to be had to the following description, and accompanying drawings, in which.

Corresponding and like parts are referred to in the following description and indicated in all of the views of the drawings by the same reference numbers.

Figure 1:
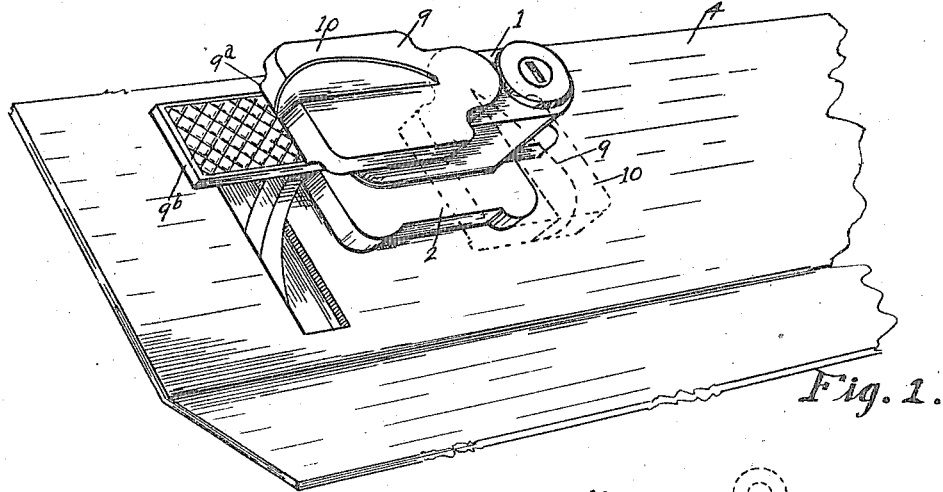
Figure 1 is a perspective view of our automobile clutch lock in position, showing clutch pedal locked in its depressed position.
Figures 2, 4:
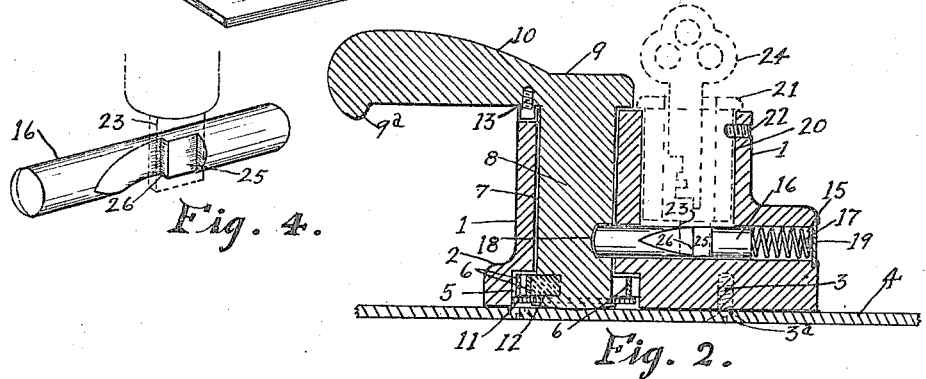
Fig. 2 is a longitudinal sectional view of our automobile clutch lock, parts assembled in locked position.
Fig. 4 is an enlarged perspective view of the locking bolt, operative bar in dotted lines.
Figure 5:
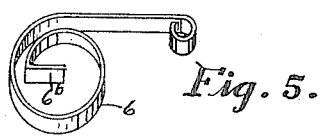
Fig. 5 is a perspective view of the releasing spring.
Figure 6:
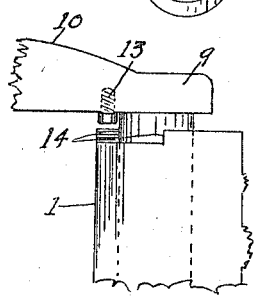
Fig. 6 is a side view, parts broken away, showing stop pin in the locking bar and shoulders in the casing to engage the stop pin.
Figure 3:
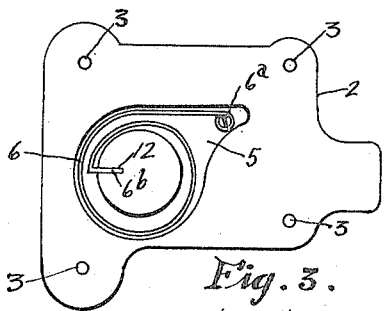
Fig. 3 is a plan view of the underside of our automobile clutch lock, showing releasing spring in place and threaded openings for fastening the lock in place.

Our improved automobile clutch lock, forming the subject matter of the present invention, comprises a casing 1 of the required size made of metal and having a flanged base 2, which is an integral part of casing 1; in the under side of flanged base 2 is a plurality of threaded blind openings 3 adapted to receive machine screws $3^a$ therein for attaching the casing 1 to the floor 4 of an automobile, also in the under side of the flanged base 2 is the depression 5 adapted to receive the releasing spring 6, said spring being held in position by means of screw $6^a$. The casing 1 has a bore 7 through the casing at right angles to the base thereof, into which is turnably secured a shaft 8, said shaft 8 having an enlarged flat locking bar 9, which is an integral part of the shaft and is eccentric with the axis of said shaft; on the upper side of the locking bar 9 is the projection 10 for the purpose of strengthening the bar 9 and to assist in turning the locking bar into its locked position. On the under side of locking bar 9 at the outer edge thereof is the projection $9^a$ adapted to engage the clutch pedal $9^b$. The shaft 8 is held in place in the casing by means of a washer 11 riveted to the shaft 8. The releasing spring 6 is also held in place by said washer, one end of the spring 6 being offset as at $6^b$, adapted to engage a slit 12 in shaft 8 in such a manner that the tension on the releasing spring is increased when the locking bar is turned to its locking position. On the under side of the bar 9 is a stop pin 13 adapted to engage shoulders 14 in the casing 1, thereby limiting the turning movement of bar 9 as required.

Parallel with the base of the casing 1 is shown a bore 15 connecting with the bore 7; this bore 15 is adapted to receive a lock bolt 16 slidably therein; at the outer end of lock bolt 16 and in bore 15 is a helical spring 17 adapted to force the lock bolt 16 into engagement with the depression 18 in the shaft 8 when the locking bar 9 is in engagement with the depressed clutch pedal $9^b$; the spring 17 is held in position by disk 19, being crimped in place.

The casing 1 has a second bore at right angles to the base, as shown at 20. extending down to the bore 15 and is centrally positioned above said bore. Bore 20 is adapted to receive any suitable key cylinder 21 therein, said cylinder 21 being held in place by means of blind set screw 22 and having a key operated bar 23 turned by a suitable key 24. The bar 23 is adapted to rest in notch 25 in the lock bolt 16 and when turned by key 24 said bar 23 engages shoulder 26 in the lock bolt 16, thereby disengaging lock bolt 16 from depression 18 in shaft 8 allowing the locking bar 9 to be disengaged from pedal 9$^b$ and turned to its unlocked position, by releasing spring 6 when pedal 9$^b$ is further depressed. The unlocked position being shown in dotted lines in Fig. 1.

The operation of our automobile clutch lock is as follows:

When it is desired to lock the clutch pedal in a depressed position, which holds the clutch out of engagement, the pedal 9$^b$ is depressed, usually by the left foot of the driver; the right foot then turns the locking bar 9 to its locking position; the lock bolt 16 is then pressed into engagement with the depression 18 in shaft 8 by means of spring 17, thereby preventing the bar 9 from turning out of engagement with clutch pedal 9$^b$. When it is desired to release the clutch pedal from its depressed position, a suitable key 24 is inserted in key cylinder 21 and turned; this turning movement carries the bar 23 around against shoulder 26 of the lock bolt 16 and withdraws said lock bolt out of engagement with the depression 18, in shaft 8, and is held in that position. By slightly pressing down the pedal 9$^b$ the locking bar is released and is turned out of engagement with the pedal 9$^b$ by the releasing spring 6 when the key may be removed.

Having thus described our invention, what we claim as new and desire to secure by Letters Patent is:

1. In an automobile clutch lock of the class described; a metal casing, having a flanged base integral therewith, means for fastening the casing to the floor of an automobile; a depression in the under side of said base; a spiral spring, positioned in said depression; means for holding the spring in place; a bore through said casing, substantially at right angles to the base; a shaft, turnable in said bore; a locking bar, eccentric to said shaft and integral therewith; a reinforcing projection, on the upper side of the locking bar, adapted to strengthen and to assist in the operation of the locking bar; a projection on the under side of the locking bar, adapted to engage a clutch pedal of an automobile; a metal washer secured to the lower end of the shaft, adapted to hold the shaft in place; means for attaching the spiral spring to the lower end of said shaft; a stop pin on the under side of the locking bar; shoulders in the casing, adapted to engage said stop pin, thereby limiting the turning movement of the locking bar; a depression, near the lower end of the shaft, adapted to receive a lock bolt therein; substantially as and for the purpose described.

2. In an automobile clutch lock of the class described; a metal casing, a flanged base integral with said casing; a plurality of threaded openings in said base, adapted to receive machine screws therein, for fastening the casing to the floor of an automobile; a depression in the under side of said base; a spiral spring positioned in said depression; means for fastening one end of the spiral spring to the base; a bore through said casing, substantially at right angles to the base; a shaft, turnable in said bore; means for retaining said shaft in place; a depression near the lower end of the shaft; a longitudinal bore substantially at right angle to the first mentioned bore and communicating therewith; a lock bolt, slidable in the longitudinal bore, adapted to engage the depression in the shaft; a helical spring positioned in the longitudinal bore, adapted to resiliently engage the end of said lock bolt; means for holding said spring in place, a key operative means for withdrawing the lock bolt out of engagement with the depression in the shaft, substantially as and for the purpose set forth.

In testimony whereof, we affix our signatures in the presence of two subscribing witnesses, this 14 day of March, 1918.

FRANCIS T. SNOW.
PETER E. MAURER.

Witnesses:
O. M. VROOMAN,
J. G. McMILLAN.

Copies of this patent may be obtained for five cents each, by addressing the "Commissioner of Patents, Washington, D. C."